United States Patent
Dean

(10) Patent No.: US 7,132,624 B2
(45) Date of Patent: Nov. 7, 2006

(54) LESS SMOKE FUME-DISPERSING DEVICE FOR WELDING OPERATIONS

(76) Inventor: Chad J. Dean, 8289 Seasons Rd., Streetsboro, OH (US) 44241

( * ) Notice: Subject to any disclaimer, the term of this patent is extended or adjusted under 35 U.S.C. 154(b) by 0 days.

(21) Appl. No.: 11/128,619

(22) Filed: May 13, 2005

(65) Prior Publication Data

US 2006/0006160 A1    Jan. 12, 2006

Related U.S. Application Data

(60) Provisional application No. 60/586,704, filed on Jul. 12, 2004.

(51) Int. Cl.
*B23K 9/32*    (2006.01)

(52) U.S. Cl. .................................. 219/137.41

(58) Field of Classification Search ........... 219/137.41, 219/74, 136, 137.9, 144
See application file for complete search history.

(56) References Cited

U.S. PATENT DOCUMENTS

| | | | |
|---|---|---|---|
| 2,373,598 A * | 4/1945 | Reeb | 219/137.9 |
| 2,538,245 A * | 1/1951 | Hiller | 219/144 |
| 3,911,242 A | 10/1975 | Strang | 219/130 |
| 3,921,223 A * | 11/1975 | Hoyecki | 2/8 |
| 5,007,664 A | 4/1991 | Mann | 285/330 |
| 5,079,404 A * | 1/1992 | Zamuner | 219/137.41 |
| 5,313,039 A | 5/1994 | Harvey et al. | 219/74 |
| 5,511,764 A | 4/1996 | Wonsetler | 266/49 |
| 5,807,414 A | 9/1998 | Schaefer | 55/385.2 |
| 5,896,579 A | 4/1999 | Johnson et al. | 2/8 |
| 6,060,689 A | 5/2000 | Wilson | 219/137.41 |

FOREIGN PATENT DOCUMENTS

DE        3936205 A1 *  5/1990

* cited by examiner

*Primary Examiner*—Clifford C. Shaw
(74) *Attorney, Agent, or Firm*—Renner, Kenner, Greive, Bobak, Taylor & Weber

(57) ABSTRACT

A fume-dispersing device and welder combination for removing unwanted gases from a welding work area comprises a welder including a grip portion having an axis, and a welding tip extending in an axial direction from said grip portion and providing a distal welding end that affects a welding operation; and a fume-dispersing device including a fume dispersion tube recessed axially from said distal end of said welding tip and providing an open end. A method is provided employing such a device.

3 Claims, 2 Drawing Sheets

LESS SMOKE FUME-DISPERSING DEVICE FOR WELDING OPERATIONS

RELATED APPLICATIONS

This application claims the benefit of Provisional Patent Application No. 60/586,704 filed on Jul. 12, 2004.

TECHNICAL FIELD

The present invention resides in the field of welding and welding accessories. More specifically, this invention relates to a fume-dispersing device for use in welding operations. By way of non-limiting example, the fume-dispersing device may be adapted for use with welders and similar devices in the field of welding.

BACKGROUND OF THE INVENTION

Welding technology comprises a variety of methods to melt metal for joining two or more pieces of metal together into a unified piece. One major category of welding includes gas-assisted welding, wherein a quantity of inert gas is constantly delivered to the welding work area to prevent the work area from being fouled by contaminants in the ambient atmosphere and to stabilize the arc and molten metal at the point of welding. Such welding is commonly referred to as MIG (metal inert gas arc welding) or TIG (tungsten inert gas arc welding).

With MIG and TIG welding, the shielding gas is typically argon, and this gas, sometimes along with other types of supplemental gases, accumulates within the work area, posing a health and safety risk. These excess gases must be removed from the general work area so as not to interfere with the integrity of the gas shield or affect the weldor's health and ability to perform high quality welding.

As is well known, virtually all welding techniques employ gases and/or produce fumes (for example, through the burning of flux material) that can accumulate at the work area to a level at which they irrate the eyes and respiratory systems of the weldor and other nearby weldors and workers. Prolonged exposure to such gases can lead to persistent irritation of the eyes, respiratory system, and other organs, and, in some cases, to long-term or permanent afflictions of these organs and systems. Welding techniques include gas welding and electric welding. Gas welding includes the use of such welders as oxygen-propane torches and oxygen-acetylene welder, whether manual or mechanical. Electric welding includes the use of such welders as AC arc welders, DC arc welders, plasma arc welders, MIG welders, TIG welders, Mig spool gun welders, whether manual or mechanical. It will be appreciated that the invention to be described herein may be adapted for use in any of these and other welding operations.

Although the prior art contains numerous fume and gas extracting devices for welding, they are generally elaborate in design and cumbersome to use, containing features that limit their practical use and flexibility in various welding applications. They also focus on an actual vacuum extraction of the gases from the work area to a remote location, rather than focusing merely on removing the gases from within the immediate work area and around the weldor. Many of the devices can actually get in the way of the welding process, particularly in tight work areas. The designs of the prior art are exemplified by the following patents: U.S. Pat. Nos. 3,911,242; 5,007,664; 5,079,404; 5,313,039; 5,511,764; 5,807,414; 5,896,579; and 6,060,689.

In light of the foregoing, there is a need in the art for a device that can prevent the excess accumulation of gases and fumes associated with various forms of welding. There further exists a need for such a device to be portable, preferably carried as part of the welding device(s). Inasmuch as various welding devices currently exist, a device addressing this need in the art should also be capable of being retrofit to such existing welding device.

SUMMARY OF THE INVENTION

As used herein "welding" will cover all various welding forms and procedures generally known or here after developed. "Welding device" and "welder" are to be understood as covering all various welding apparatus. A MIG welder is particularly shown in the drawings, and those of ordinary skill in the art will readily appreciate the application that the present invention will have for other welders, and will readily appreciate how to incorporate this invention into their design. These other welders may include, but are not limited to oxygen-propane torches and oxygen-acetylene welder (gas welding devises); and AC arc welders, DC arc welders, plasma arc welders, MIG welders, TIG welders, Mig spool gun welders (electric welding devices). The listing of specific welders here is not to limit the invention.

This invention addresses a continuing need for a new and improved fume-extracting device for welding devices and procedures that will remove excess gas and fume accumulation associated with various forms of welding, without interfering with the use of such devices. This invention addresses this continuing need by focusing more particularly on dispersion rather than extraction. That is, while many of the devices of the prior art actually extract excess gas and fumes by vacuuming the gases and fumes away from the work area, the present invention focuses on blowing air into the work area to create flow currents and disperse the gases and fumes that are accumulating at the work area. In doing so, the present invention provides a much less complicated and less bulky design that can be used even in the tightest of work areas. Realizing that the gases and fumes in the work area are at temperatures above ambient temperature, blowing into the work area to create air flow currents gets the gases and fumes moving, and they rise up out of the work area simply due to convection currents, and the current created by the air blown from the device.

The fume-dispersing device of this invention can be selectively attached to various welders. If necessary, the fume-dispersing device can be removed from the welder and be selectively attached to a work table or work station in close proximity to the point of welding, and, from such position, can perform its intended function of removing excess gas and fumes from the work area. This invention substantially departs from the conventional concepts and designs of the prior art, and provides an apparatus that substantially fulfills needs in the art.

It is an object of this invention to provide a low cost, easy to manufacture and easy to market fume-dispersing device. It is a further object of this invention to provide a fume-dispersing device that is not bulky, so that it may be employed even in tight work areas.

It is yet another object of this invention to provide a fume-dispersing device that may be selectively fit to various welders.

A fume-dispersing device and welder combination for removing unwanted gases from a welding work area comprising a welder including a grip portion having an axis, and a welding tip extending in an axial direction from said grip portion and providing a distal welding end that affects a welding operation; and a fume-dispersing device including a fume dispersion tube recessed axially from said distal end of said welding tip and providing an open end.

A method for removing unwanted gases from a welding work area comprising the steps of performing a welding operation at a welding work area, wherein unwanted gases are delivered or formed at said welding work area during said step of performing; and delivering a stream of air to said welding work area during said step of performing, wherein (a) said step of performing is carried out with a welder including a grip portion having an axis, and a welding tip extending in an axial direction from said grip portion and providing a distal welding end that affects the welding operation, and (b) said step of delivering is carried out by a fume-dispersing device including a fume dispersion tube recessed axially from said distal end of said welding tip and providing an open end at which the stream of air is delivered.

BRIEF DESCRIPTION OF THE DRAWINGS

At least one or more of the foregoing and other objects, features and advantages of this invention will be understood from the following description of the preferred embodiment of the invention, as illustrated in the accompanying drawings.

PREFERRED EMBODIMENT FOR CARRYING OUT THE INVENTION

Figure 1:
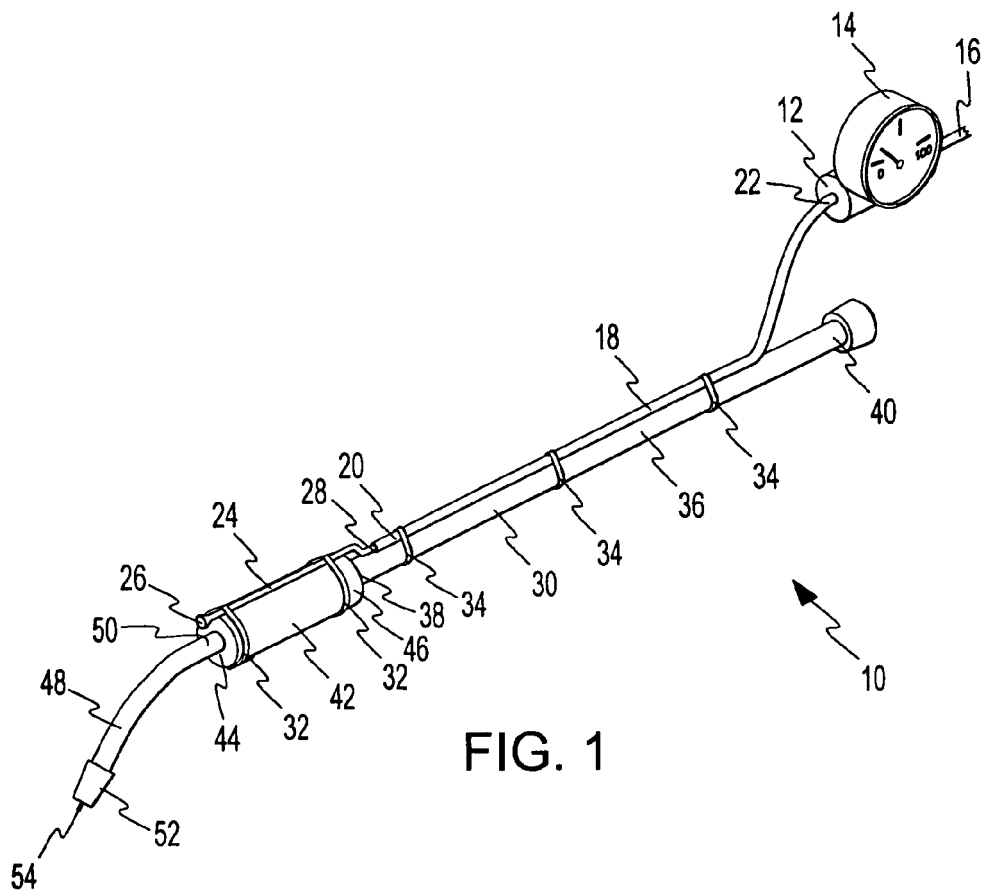
FIG. 1 is a perspective view of the fume-dispersing device in accordance with this invention, shown employed with a welder.
Figure 2:
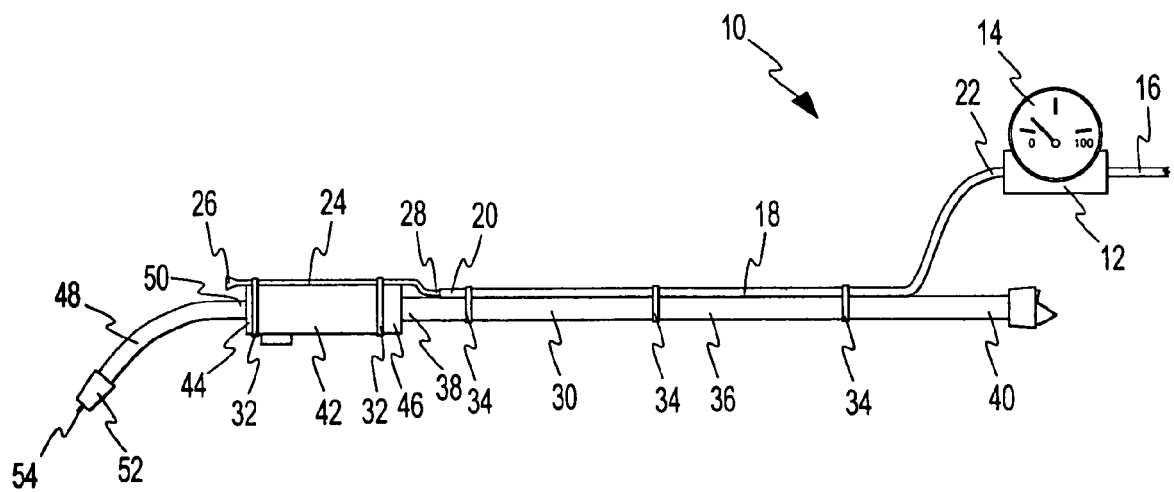
FIG. 2 is a side elevational view thereof.

Referring now to FIGS. 1 and 2, an embodiment of a fume-dispersing device for a welder is shown and designated by the numeral 10. Device 10 includes air regulator 12, having gauge 14 and feed hose 16, which fluidly connects to a pressurized air source such as an air compressor (not shown). These are known items, and it will be appreciated that air regulator 12 can be employed to adjust the pressure of air being fed with feed tube 16, with gauge 14 providing a readout of the pressure. Air regulator 12 communicates with air hose 18, having outlet end 20 and inlet end 22. Outlet end 20 communicates with fume dispersion tube 24. Fume dispersion tube 24 includes open end 26 and inlet end 28, which is in fluid communication with outlet end 20 of air hose 18. Thus, pressurized air fed with feed hose 16 and air regulator 12 travels through air hose 18 and ultimately is expelled out of open end 26 of fume dispersion tube 24.

Air regulator 12 is preferably adjustable, having a working pressure range of from 0 to 100 PSI. Working air pressure is delivered by means of an air compressor or other pressurized air source that is connected to air regulator 12 by feed hose 16. Air hose 18 is preferably comprised of material that is flexible, such as rubbers, elastomers, soft plastics, and the like, and has a sidewall that is resistant to the transmission of air, moisture, and various liquids. Fume dispersion tube 24 is preferably comprised of copper or other suitable malleable metals, for reasons that will be explained more fully herein below. Although the present invention is not to be necessarily limited to any disclosed dimensions, air hose 18 preferably has an inside diameter (ID) of from about ⅛ to ½ inches, more preferably, from 3/16 to 5/16 inches, and fume dispersion tube 24 preferably has an outside diameter (OD) of from about ⅛ to ½ inches, more particularly 3/16 to 5/16 inches. In a particular embodiment reduced to practice, air hose 18 has an ID of 3/16 inch and fume dispersion tube 24 has an OD of 3/16 inch. Generally, to improve the fit between air hose 18 and fume dispersion tube 24, the ID of the former will be chosen to match the OD of the later. The fit could go the other way, with the air hose going inside dispersion tube, although the opposite is preferred. Appropriate clamps and/or adhesives may be employed to improve the connections between tubes and hoses.

Figure 4:
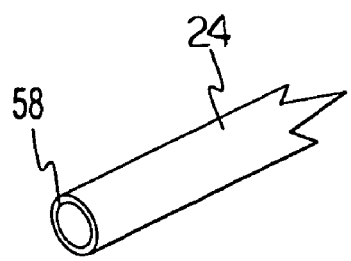
FIG. 4 is an exploded perspective view of a second embodiment of the open end.
Figure 5:
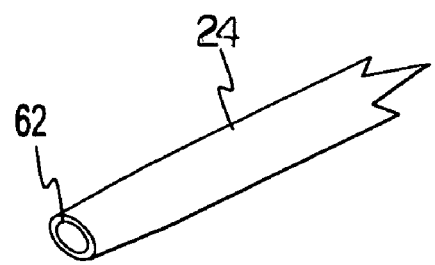
FIG. 5 is an exploded perspective view of yet another embodiment of the open end.

The force and airflow of air blown out of fume dispersion tube 24 will depend upon the air pressure from air regulator 12 and the geometry of open end 26. The ID at open end 26 is preferably from slightly less than ⅛ to slightly greater than ½, depending upon the dimension for tube 24 and the shape of open end 26. Thus, ID dimensions from about ⅙ to about ⅝ inch are preferred for open end 26. Different shapes for open end 26 are explained more fully below with reference to FIGS. 3–5. In a particular embodiment reduced to practice, tube 24 is of uniform diameter from air hose 18 to open end 26, and open end 26 has an ID of 3/25 inch (actually 0.119 inch).

Air hose 18 is attached to fume dispersion tube 24 at outlet end 20, and is attached to air regulator 12 at inlet end 22. A portion of inlet end 28 of fume dispersion tube 24 is received in outlet end 20 of air hose 18, and is secured therein by frictional engagement, because the OD of fume dispersion tube 24 is slightly larger than the ID of air hose 18. Suitable radial clamps (e.g., zip ties, tape, hook-and-loop ties, etc.) could be employed to further secure this connection in an airtight manner.

In the embodiment shown, fume-dispersing device 10 is secured to a welder 30 by a series of fasteners 32, 34. Fasteners 32, 34 may be comprised of suitable radial clamps such as tape, hook-and-loop type fasteners, plastic ties or straps, metal straps, and the like. Welder 30 will be recognized as the type used in various gas-assisted welding technologies, such as MIG or TIG welding, in which a quantity of gas is delivered from an outside source to the welding tip so as to prevent the work area from being fouled by contaminants in the ambient atmosphere and to stabilize the arc and molten metal at the point of welding. Welder 30 includes tube 36, having first end 38 and second end 40, a hollow finger grip 42, having first end 44 and second end 46, and welding tip 48, having first end 50 and second end 52. Internal electrode 54 protrudes from second end 52 and, as known, delivers an arc of electricity along with a quantity of gas to weld items together. Tube 36 is connected at second end 40 to a flexible cord or tube (not shown) that delivers electric current and a continuous stream of gas to welding tip 48.

Fasteners 32 attached fume dispersion tube 24 to finger grip 42, and fasteners 34 attach air hose 18 to tube 36, which may also be called the whip or lead of the welder. This keeps the air hose out of the way, and keeps the fume dispersion tube in a useful location. In this manner, open end 26 of fume dispersion tube 24 extends a slight distance beyond first end 44 of finger grip 42, while being recessed away from the distal end of electrode 54. In this manner, air forced through air hose 18 and fume dispersion tube 24 and exiting at open end 26 is able to reach the gases and fumes accumulating at a work area, without interfering in any significant way with the welding operation, even in the tightest of work areas. It should be appreciated that open end 26 points substantially parallel to tube 36 and finger grip 42, while electrode 54, which affects the welding, points off at an angle, and this orientation may prevent air forced out of open end 26 from beneficially dispersing accumulated gases and fumes. Thus, fume dispersion tube 24 is preferably formed of copper and other malleable materials, as mentioned above, so that the portion of fume dispersion tube 24 extending beyond finger grip 42 may be bent or re-aligned to accommodate the configuration of specific welding tips 48. By making fume dispersion tube 24 from a malleable metal or other material capable of maintaining a shape to which it is bent, the weldor has the ability to orient the output of air in virtually any desired direction relative to the welding tip and its electrode.

During welding, a weldor holds welder 30 with one hand, at finger grip 42, so as to orient second end 52 and electrode 54 over a portion of metal to be welded. As welding proceeds with the electric arc created and maintained by electrode 54, gas is delivered around electrode 54, in a known manner. A welding rod, if used, is held in the weldor's other hand, at the arc and over the metal being welded, and the weldor manipulates the rod to deliver a continuous quantity of metal to the metal being welded. The compressor (not shown) attached to feed hose 16 of fume-dispersing device 10 blows air through feed hose 16, air regulator 12, inlet hose 18, and fume dispersion tube 24. Thus, any gas accumulating at the work area is blown away from open end 26 to an area beyond the working area of the weldor or other personnel in the shop. More particularly, air blown from device 10 initiates air currents, both from convection and from the physical force of the air, and the hot gases around the work area are borne away on these currents. Air regulator 12 can be adjusted as necessary to vary the amount of air pressure within device 10 to ensure that excess gas does not accumulate in and around the work area.

In general, the air pressure at air regulator 12, as measured at gauge 14 will range from about greater than zero to about 100 PSI, preferably from 10 to 80 PSI, and more preferably from 15 to 60 PSI. In practice with the MIG welder shown in the drawings, the air pressure is typically set somewhere between 30 and 45 PSI.

Figure 3:
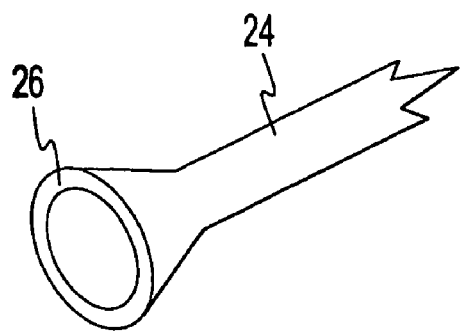
FIG. 3 is an exploded perspective view of an embodiment for the open end of the fume-dispersing device.

Referring now to FIG. 3, an embodiment of fume dispersion tube 24, particularly open end 26 thereof, is shown in detail. In this embodiment, open end 26 provides a flared, conically shaped tip. In an alternative embodiment shown in FIG. 4, fume dispersion tube 24 extends straight to open end 58, having a diameter that is substantially identical to the diameter of tube 24. In the embodiment shown in FIG. 5, tube 24 tapers as it extends to open end 62, having a diameter that is less than that of the diameter of tube 24. Using fume dispersion tube 24 with these various open ends 26, 58, 62, allows a weldor to vary, in conjunction with the working pressure delivered by the compressor, the amount of gas blown away from the working area during welding. For instance, tube 24, with flared open end 26, targets a wider working area and removes more gas during a particular amount of time, while tube 24, with tapered open end 62, targets a smaller area and removes less gas. However, it will be appreciated that the force of air exiting the differently shaped open ends will vary, with the smaller openings providing more air force.

If necessary, depending upon work conditions, fume-dispersing device 10 can be readily detached from welder 30 and reattached to a work table or other structure or component proximate the work area. This action may be necessary if work is being performed in a confined area, although, due to the size of fume-dispersing devices in accordance with this invention, the need for such removal will likely be very rare.

Although a welder 30 has been disclosed in detail as being employed in conjunction with a fume-dispersing device 10 in accordance with this invention, it will be appreciated that fume-dispersing devices in accordance with this invention may be adapted to be employed in conjunction with other welders. By way of non-limiting example, fume-dispersing devices in accordance with this invention can be selectively attached to oxygen-propane torches and oxygen-acetylene welder (gas welding devises); and AC arc welders, DC arc welders, plasma arc welders, MIG welders, TIG welders, Mig spool gun welders (electric welding devices).

In light of the foregoing, it will be understood by persons skilled in the art that an improved fume-dispersing device for use with various welders in various welding procedures has been provided. The invention is relatively simple and easy to manufacture, yet affords a variety of uses. While the description contains many specifics, these should not be construed as limitations on the scope of the invention, but rather as an exemplification of the preferred embodiment thereof. The foregoing is considered as illustrative only of the principles of the invention. Further, since numerous modifications and changes will readily occur to those skilled in the art, the invention is not limited to the exact construction and operation shown and described, and all suitable modifications and equivalents may be resorted to, falling within the scope of the attached claims.

What is claimed is:

1. A fume-dispersing device and welder combination for removing unwanted gases from a welding work area comprising:
   a welder including:
      a grip portion having an axis, and
      a welding tip extending in an axial direction from said grip portion and providing a distal welding end that affects a welding operation; and
   a fume-dispersing device including:
      a fume dispersion tube recessed axially from said distal end of said welding tip and providing an open end, wherein at least a portion of said fume dispersion tube is formed from a malleable material that can be bent to change the direction in which said open end of said fume dispersion tube points relative to said welding tip.

2. The combination of claim 1, further comprising an air regulator in fluid communication with a source of pressurized gas, and in fluid communication with said fume dispersion tube to regulate airflow therethrough and out said open end thereof.

3. A method for removing unwanted gases from a welding work area comprising the steps of:
   performing a welding operation at a welding work area, wherein unwanted gases are delivered or formed at said welding work area during said step of performing; and
   delivering a stream of air to said welding work area during said step of performing, wherein
      (a) said step of performing is carried out with a welder including:
         a grip portion having an axis, and
         a welding tip extending in an axial direction from said grip portion and providing a distal welding end that affects the welding operation, and
      (b) said step of delivering is carried out by a fume-dispersing device including:

a fume dispersion tube recessed axially from said distal end of said welding tip and providing an open end at which the stream of air is delivered, wherein at least a portion of said fume dispersion tube is formed from a malleable material that can be bent to change the direction in which said open end of said fume dispersion tube points relative to said welding tip.

* * * * *